United States Patent [19]

Bobby

[11] 4,242,929

[45] Jan. 6, 1981

[54] WIRE STRIPPING DEVICE

[76] Inventor: Fults J. Bobby, Rte. 1, Box 340CC, Decherd, Tenn. 37324

[21] Appl. No.: 21,118

[22] Filed: Mar. 16, 1979

[51] Int. Cl.³ .............................................. H02G 1/12
[52] U.S. Cl. .................................. 81/9.5 R; 30/90.1
[58] Field of Search ............ 30/90.1; 81/9.5 R, 9.5 A, 81/9.51; 83/881

[56] References Cited

U.S. PATENT DOCUMENTS

| | | | |
|---|---|---|---|
| 2,268,820 | 1/1942 | Hannan | 81/9.51 X |
| 2,657,601 | 11/1953 | Bentley | 81/9.51 |
| 3,182,532 | 5/1965 | Oehlerking | 81/9.5 A |
| 3,257,722 | 6/1966 | Caine | 30/90.1 |
| 3,822,470 | 7/1974 | Hildebrand | 30/90.1 |
| 3,935,759 | 2/1976 | Roth | 81/9.51 |

*Primary Examiner*—James G. Smith
*Attorney, Agent, or Firm*—Harrington A. Lackey

[57] ABSTRACT

A manually operable, portable, wire stripping device including a block member having a top platform surface and a knife blade projecting above said platform surface for receiving an insulated conductor transversely thereover, a plate member operatively connected to the block member for both longitudinal and vertical movement relative to the platform surface for the engagement and rolling of the insulated conductor longitudinally of the knife blade for circumferentially cutting the insulation around the conductor. A spring member is provided for biasing the plate member longitudinally to its inoperative position, and a cam track member is provided for restoring the plate member to an elevated attitude in its inoperative position.

A manually operated cam mechanism is provided for adjusting the height of the knife blade relative to the platform surface to accommodate insulation sheathings of different thicknesses.

8 Claims, 5 Drawing Figures

WIRE STRIPPING DEVICE

BACKGROUND OF THE INVENTION

This invention relates to a wire stripping device, and more particularly to a manually operated wire stripping device.

Wire stripping devices of various types are known in the art for circumferentially cutting the annular insulation or sheathing around an electrical conductor of generally circular cross-section.

Typical wire stripping devices are disclosed in the following U.S. Pat. Nos.:

2,268,820 Hannan, Jan. 6, 1942;
2,657,601 Bentley, Nov. 3, 1953;
3,196,721 Brandon, July 27, 1965;
3,822,470 Hildebrand, July 9, 1974.

As disclosed in several of the above patents, the concept of adjusting the height of the knife blade to cut only the thickness of the insulation sheeting, is known.

The concept of rolling the sheathed conductor in order to circumferentially cut the insulation sheathing is also known, as disclosed in all of the above cited U.S. patents.

SUMMARY OF THE INVENTION

It is an object of this invention to provide a lightweight, hand-held, manually-operated, wire stripping device incorporating the above concepts of rolling the sheathed conductor in order to cut the insulated sheathing, and also to provide novel means for adjusting the height of the cutter blade in a gradual manner to accommodate the cutting of the sheathing of different thicknesses.

The wire stripping device made in accordance with this invention includes a hand-held casing or housing having a fixed block member with a top platform surface and an elongated knife blade adjustably supported within or beside the block member for gradually raising and lowering the knife blade relative to the platform surface. Elongated openings in the side walls of the housing permit the insertion of an insulated conductor transversely across the knife blade of the platform surface.

Located above the block member is a longitudinally movable plate member having a handle or thumb pad projecting upward through an elongated opening in the top wall of the housing for manipulation of the plate member longitudinally over the block member and the transverse conductor inserted between the plate member and the knife blade. The plate member is operatively connected to the block member through a mounting device including longitudinal guide elements and a spring member urging the guide elements in one direction so that the plate member will be normally biased to an inoperative rear or starting position. The guide elements also cooperate to permit vertical movement of the plate member relative to the platform surface during the longitudinal movement of the plate member over the platform surface. A yielding guide track biases the plate member to an elevated attitude in its inoperative position.

Thus, the mounting and guiding mechanism permits the manual movement of the plate member, not only forward, but also downward, relative to the block member to engage the sheathed transverse conductor and to roll the conductor with downward pressure against the elongated knife blade. After the conductor has been rotated through 360°, the sheathing will be circumferentially cut, and while the plate member is depressed, the end of the conductor can be pulled transversely from the housing to completely strip the annular insulated sheathing from the conductor.

An elongated longitudinally movable cam bar cooperates with the elongated knife blade to raise and lower the knife blade gradually in response to the longitudinal movement of a manually operated handle member projecting from the side of the housing.

DESCRIPTION OF THE PREFERRED EMBODIMENTS

Figure 1:
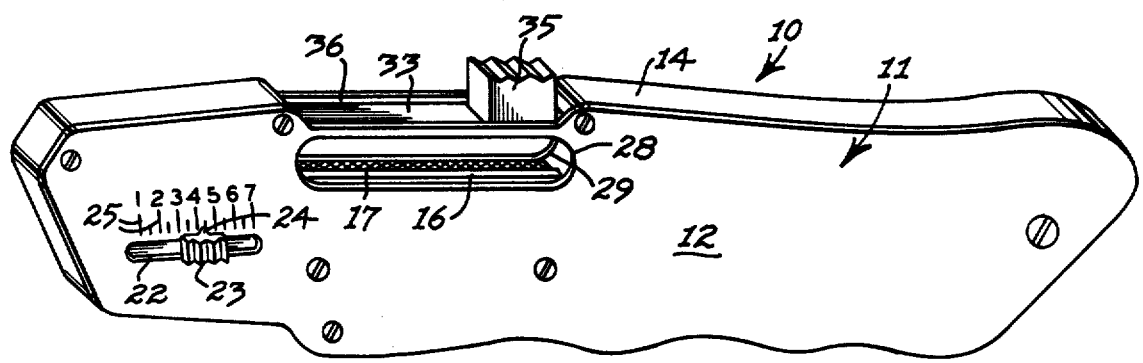
FIG. 1 is a side perspective view of the stripping device made in accordance with this invention.
Figure 2:
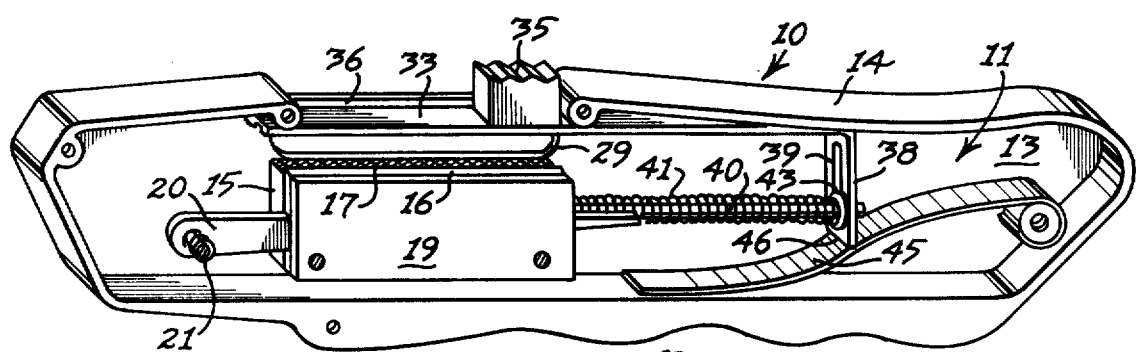
FIG. 2 is the same perspective view of the stripping device disclosed in FIG. 1, with the left side wall removed.

Referring now to the drawings in more detail, the wire stripping device 10 made in accordance with this invention includes a housing 11 having opposed side walls 12 and 13 and a top wall 14. The housing 11 is preferably elongated and of a size adapted to be easily gripped by one hand for manipulation solely by the thumb of the same hand.

Within the housing 11 is a block member 15 fixed relative to the housing 11. The block member 15 is provided with an adjustable support for an elongated knife blade 16 adapted to project above the upper platform surface 17. A vertical channel for receiving the knife blade 16 is defined by a stationary bottom knife support bar or plate 18 and a vertical side plate 19. Adapted to slide longitudinally reciprocally within the channel vertically between the bottom support plate 18 and the bottom of the knife blade 16 is an elongated wedge-shaped or tapered cam bar 20. Thus, longitudinal movement of the cam bar 20 rearward causes the knife blade 16 to rise, while forward longitudinal movement of the cam bar 20 permits the knife blade 16 to fall, relative to the platform surface 16. The bottom knife support plate 18 and the side wall 19 are fixed to the block member 15. It will be understood that the block member 15, bottom support 18 and side wall 19 could be formed from an integral block having a vertical channel or recess therein for receiving the longitudinally movable cam bar 20 and the vertically movable knife blade 16, if desired.

The front end of the cam bar 20 is provided with an operator rod 21 which projects through an elongated slot 22 (FIG. 1) in the left side wall 12, and terminates in a manually operated handle or thumb pad 23. The thumb pad 23 is provided with an index pointer 24 adapted to register with longitudinally spaced and numbered graduation marks 25. These graduation marks are calibrated to indicate the height of the portion of the knife blade 16 projecting above the platform surface 17. These graduation marks 25 may be calibrated to various thicknesses of the annular sheathing for various sizes of insulated electrical conductors.

Figure 4:
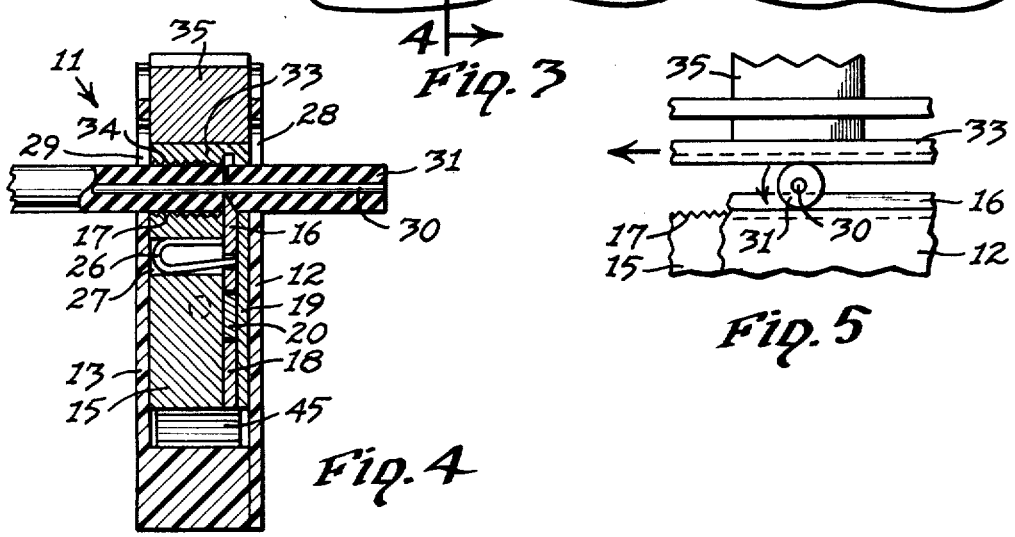
FIG. 4 is an enlarged section taken along the line 4—4 of FIG. 3, illustrating the knife blade cutting the insulated sheathing of a conductor disclosed in phantom.

As illustrated in FIG. 4, the knife blade 16 is biased constantly downward against the cam bar 20 by a U-shaped spring member 26 received in a spring recess 27 within the block member 15.

Figure 3:
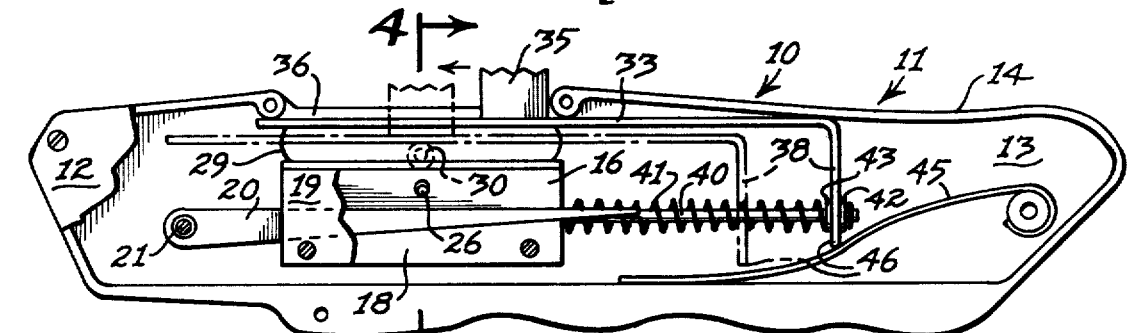
FIG. 3 is a left side elevation of the stripping device, with the major portion of the left side wall removed, and disclosing the plate member in a solid-line inoperative position and a phantom-line operative position.

Formed in opposed relationship in the respective side walls 12 and 13 above the platform surface 17 are a pair of elongated slots 28 and 29. An electrical conductor 30 having an annular insulated sheathing 31 may be inserted through both elongated slots 28 and 29 to dispose the conductor 30 transversely across the knife blade 16 and the platform surface 17, as best disclosed in FIGS. 3 and 4.

Disposed above the platform surface 17 is a movable or rolling plate member 33 having a bottom surface 34 knurled or otherwise roughened to frictionally grip the sheathing 31 of the conductor 30 in operative position. The top surface of the plate member 33 is provided with an upward projecting handle or thumb pad 35, which projects through an elongated upper slot 36 formed in the top wall 14 of the housing 11, as disclosed in FIGS. 1–4.

Plate member 33 extends rearwardly far enough to permit the thumb pad 35 to move far enough forward to engage the front edge of the slot 36, if necessary, during the cutting operation. The rear end of the plate member 33 terminates in a depending coupling member or flange 38 having a vertical elongated slot 39 therein. Received within the vertical slot 39 is an elongated guide rod 40 fixed to and projecting rearwardly from the block member 15. Thus, as the thumb pad 35 is moved fowardly to carry the plate member 33 therewith, the coupling flange 38 is guided longitudinally forward over the guide rod 40.

A coil spring 41 is coiled around the guide rod 40 and is biased to urge the coupling flange 38 rearwardly. Thus, as the thumb pad 35 is moved forward, the simultaneous forward movement of the coupling flange 38 compresses the coil spring 41 against the block member 15. The rear end of the elongated guide rod 40 is provided with a stop washer 42 to limit the rearward movement of the coupling flange 38 relative to the rod 40. A floating washer 43 is freely mounted around the rod 40 in front of the coupling flange 38 to limit the rearward movement of the expanding coil spring 41, but compresses the coil spring 41 when the coupling flange 38 is moved forward.

An elongated slightly curved spring strip 45 is fixed at its rear end to the housing 11 and curves forward and downward to provide a cam track for the bottom edge 46 to the coupling flange 38. Thus, the guide track 45 engages the bottom edge 46 of the coupling flange 38 as the plate member 33 is retracted to its inoperative position disclosed in FIGS. 1–3, and thereby elevates the plate member 33 to its upper inoperative position so that another conductor 30 may be inserted transversely through the opposed side slots 28 and 29 in the housing 11. The guide track 45 declines forward to permit the plate member 33 to be depressed as it moves forward, as illustrated by its phantom position in FIG. 3.

If desired, the platform surface 17 may also be roughened or knurled to assist in gripping the insulation sheathing 31 of the conductor 30.

In the operation of the device 10, the thumb pad 23 is first moved to the desired graduation position to elevate or lower the knife blade 16 to the desired height above the platform surface 17, to correspond to the thickness of the insulating sheathing 31 to be cut. The conductor 30 is then inserted, transversely through the side slots 28 and 29 above the platform surface 17 and below the plate member 33. The operator grips the rear portion of the housing 11 behind the thumb pad 35 and depresses the thumb pad 35 causing the plate member 33 to engage the transversely positioned conductor. The thumb pad 35 is then urged forward and downward to cause the insulated conductor 30 to roll forward over the elongated stationary knife 16. Pressure is exerted simultaneously through the thumb pad 35 upon the plate member 33 to force the knife blade 16 to cut into the insulated sheathing. Continued forward and downward urging of the thumb pad 35 causes the conductor to roll until the conductor rotates through 360 degrees to completely circumferentially cut and separate the sheathing 31 from the conductor 30.

While the thumb pad 36 is depressed, the operator can grip and pull laterally outward from the housing 11, the uncut portion of the insulated conductor, thereby causing the cut insulation to be stripped from the bare copper wire or conductor 30.

Figure 5:
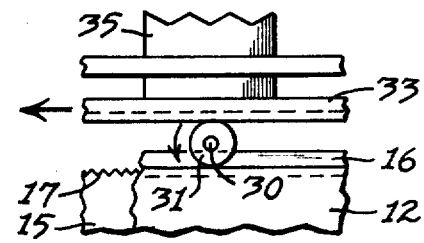
FIG. 5 is a fragmentary, schematic, side elevational view of the plate member engaging and rolling the conductor longitudinally of the fixed knife blade and platform surface.

FIG. 5 schematically illustrates the operation of the engagement of the conductor 30 by the foward moving plate member 33 to cause the conductor to roll in the direction of the arrow disclosed in FIG. 5.

After the conductor has been stripped and removed from the slots 28 and 29, the operator may release the pressure and grip upon the thumb pad 35, whereby the energy in the compressed coil spring 41 urges the pressure plate member 33 rearward to its inoperative position in which the thumb pad 35 engages the rear edge of the top slot 36. Moreover, the bottom edge 46 engages the inclined guide track 45 which urges upward the coupling flange 38 to simultaneously elevate the pressure plate member 33, preparatory to receiving another conductor 30 through the slots 28 and 29 and between the knife blade 16 and the pressure plate 33, for the next cutting and stripping operation.

What is claimed is:

1. A device for stripping annular insulation from a conductor of substantially circular cross-section comprising:
   (a) a stationary block member including an upper platform surface having a longitudinal dimension,
   (b) an elongated knife blade projecting above said platform surface,
   (c) a plate member above said platform surface and having a bottom conductor-gripping face,
   (d) mounting means supporting said plate member for longitudinal and vertical movement over said platform surface and said knife blade for engaging an insulated conductor spanning said platform surface transversely over said knife blade and rolling said conductor, causing said knife blade to circumferentially cut the insulation on said conductor,
   (e) said mounting means comprising a first elongated guide member projecting longitudinally of one end of said block member,
   (f) said mounting means further comprising a second elongated guide member projecting from said plate member longitudinally in the same direction as said first guide member, (g) cooperative means coupling said first and second elongated guide members to permit relative longitudinal movement of one of said guide members relative to said other guide member, and (h) said mounting means permitting vertical movement of said plate member relative to said platform surface.

2. The invention according to claim 1 in which said first guide member comprises an elongated guide member fixed to said block member, said cooperative means comprising a coupling member having a slot fixed to said second guide member, said first guide member extending through the slot of said coupling member, whereby said coupling member is movable longitudinally of said first guide member.

3. The invention according to claim 2 in which said slot is a vertically elongated slot, whereby said first and second guide members have limited vertical movement relative to each other.

4. The invention according to claim 3 further comprising spring means cooperative between said first and second elongated members biased to urge said plate member longitudinally toward a first inoperative position at one end of said platform surface, the longitudinal movement in the opposite direction for cutting the insulation on said conductor causing said spring means to compress.

5. The invention according to claim 4 further comprising a resilient guide track member in guiding relationship with said coupling member to permit the descent of said coupling member and said plate member when said plate member is moved longitudinally toward an operative position, and for elevating said coupling member when said plate member is in its inoperative position.

6. The invention according to claim 1 further comprising longitudinal cam means cooperative with said knife blade, whereby longitudinal movement of said cam means in one longitudinal direction raises said knife blade relative to said platform surface and longitudinal movement of said cam means in the opposite longitudinal direction permits said knife blade to descend relative to said platform surface.

7. The invention according to claim 6 further comprising spring means operatively connected to said knife blade for biasing said knife blade downward against the action of said cam means.

8. The invention according to claim 1 comprising first manual means fixed to said plate member for manually urging said plate member longitudinally and vertically relative to said platform surface, a housing receiving said block member, said knife blade, said plate member and said mounting means, said housing having means therein immediately above said platform surface to permit the insertion of an insulated conductor transversely over said platform surface and below said plate member.

* * * * *